Patented May 2, 1950

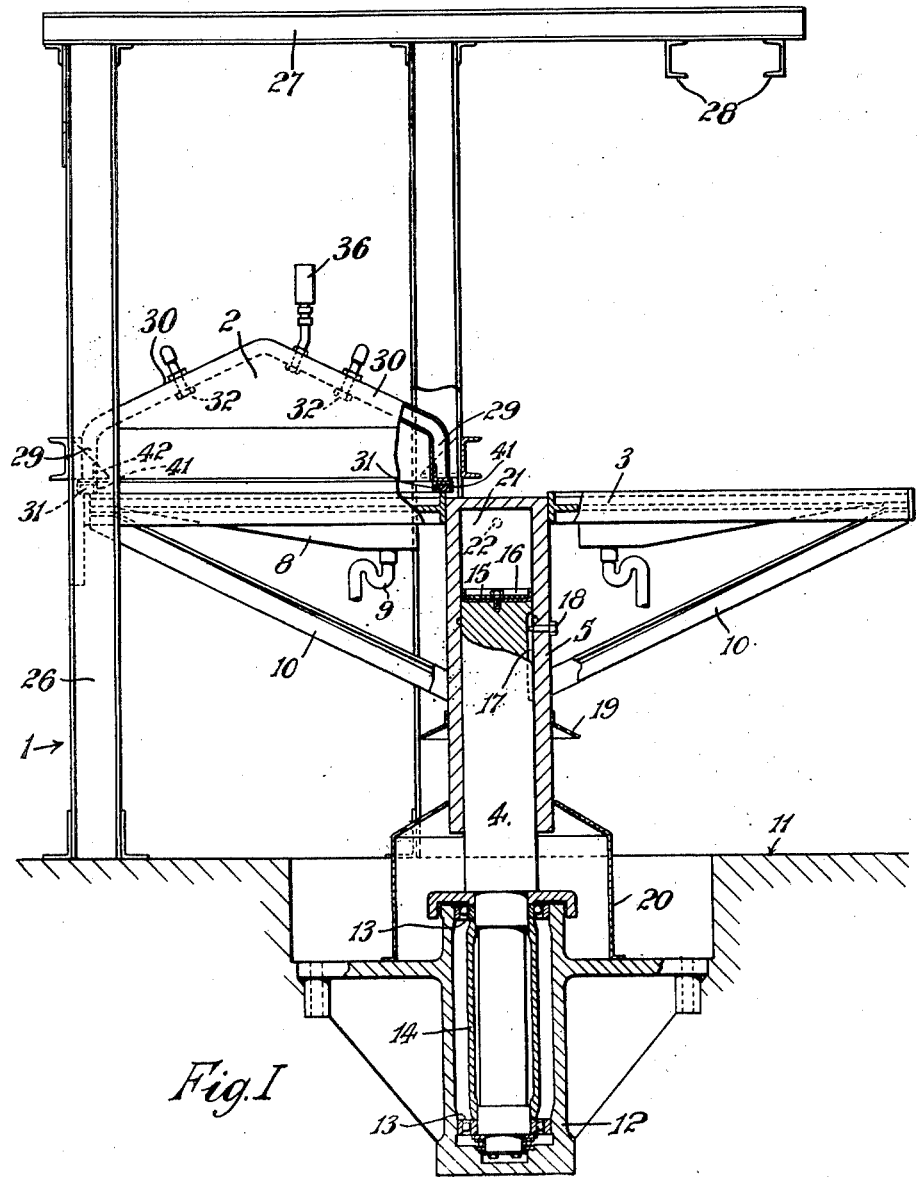

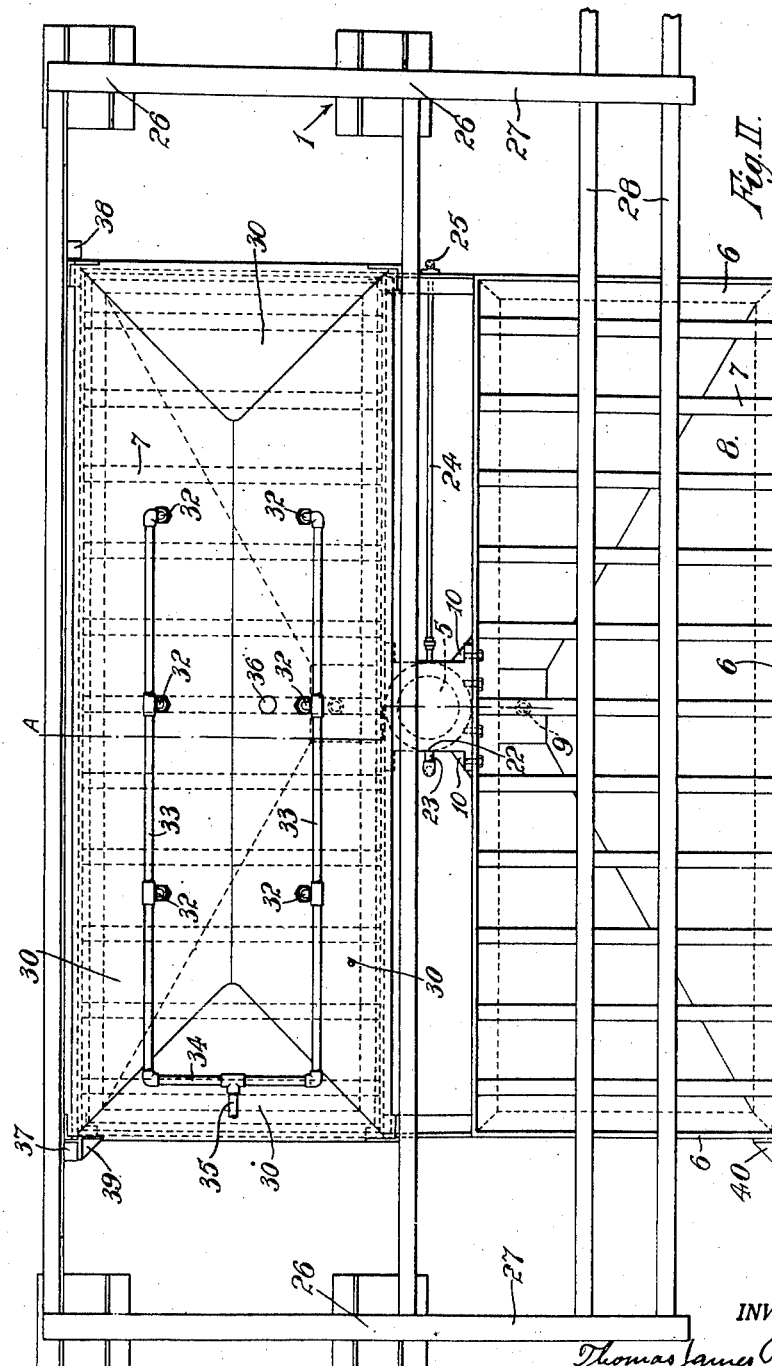

2,505,826

UNITED STATES PATENT OFFICE 2,505,826

APPARATUS FOR VULCANIZING RUBBER OR THE LIKE

Thomas James Rimbault Dibdin, Liverpool, England, assignor to Dunlop Tire and Rubber Corporation, Buffalo, N. Y., a corporation of New York Application February 14, 1948, Serial No. 8,466
In Great Britain February 11, 1947

Section 1, Public Law 690, August 8, 1946
Patent expires February 11, 1967

5 Claims. (Cl. 18—6)

My invention relates to improvements in apparatus for gelling and vulcanizing compounded aqueous dispersions of rubber, particularly foamed, compounded aqueous dispersions of rubber.

In the preparation of articles of vulcanized natural or synthetic rubber which have a sponge-like character, a foamed aqueous dispersion of the unvulcanized rubber containing gelling and vulcanizing agents is poured into a mould to impart the required shape to the article and is then gelled. The nature and quantity of gelling agents present may be such that the foamed dispersion gels in the mould while in the cold state, or they may be such that heat has to be applied to the mould to effect gelling. After gel'ing the foamed dispersion is heated to vulcanize the rubber.

It is known to gel and vulcanize rubber by passing closed moulds containing a foamed compounded rubber dispersion through a tank of hot water, or by enveloping closed or open moulds in an atmosphere of steam in an autoclave, but it has been found that the movement of the moulds prior to the vulcanization of the rubber therein necessitated by these prior methods tended to produce objectionable rippled surfaces on the final product. It was also found that the final product has an objectionable appearance if open moulds are used and steam condensate drips upon the ungelled foam.

My present invention obviates the above disadvantages and provides apparatus for gelling and vulcanizing foamed compounded aqueous dispersions of natural or synthetic rubber by means of steam wherein the risk of condensate dripping onto the ungelled foam when open moulds are used is reduced, while the movement of the moulds containing the ungelled foam can be effected smoothly and without vibration. My invention further provides apparatus for vulcanizing compounded aqueous dispersions of natural or synthetic rubber, particularly foamed compounded aqueous dispersions of rubber, by means of steam at substantially atmospheric pressure.

According to the present invention apparatus for vulcanizing rubber in moulds comprises a rotatable base having a plurality of mould-supporting positions and adapted to locate each position in turn at a predetermined station, a stationary cover member located above said station, means for raising said base into contact with said cover to form a chamber enclosing any of said positions and for lowering said base to open said chamber and means for introducing steam within said chamber. Preferably the said base is provided with means for preventing the pressure within the said chamber from rising above atmospheric.

The various features of my invention are illustrated by way of example in the accompanying drawings, in which:

Fig. I represents an end elevation of an apparatus according to the invention, partly in section.

Fig. II represents a plan view of the apparatus.

Apparatus as shown in the accompanying drawings comprises framework and girder members, indicated generally at 1, supporting a cover 2 for the moulds, and a means whereby it may be raised and lowered and rotated. In the embodiment illustrated, this means comprises a rotatable base 3 mounted on a pillar 4 by means of a hollow cylindrical member 5 movable vertically relative to the pillar and rotatable therewith. Support 3 is adapted to accommodate two rectangular moulds in side by side relationship so that either mould can be brought directly under cover 2 on rotation of the base 3.

The base 3 is formed of two parts, one lying on either side of the central hollow cylindrical member 5, and each part comprises a rectangular framework 6, a number of bars 7 extending across the width of the framework 6 to support a mould and a trough 8 extending from framework 6 beneath the bars 7 to catch condensate. At the lowest part of each trough 8 an S-shape trap 9 is provided from which condensate can escape without permitting the escape of steam. Condensate can pass from trap 9 to a drain by means not shown, which means may suitably be a pipe capable of being rapidly connected or disconnected to whichever of the S-shaped traps 9 is beneath the cover 2.

Each framework 6 is bolted to the other and to the member 5 and is further supported by members 10. The lower part of pillar 4 is of reduced diameter and is accommodated in a mounting 12, suitably set in concrete below the ground level indicated at 11. Two ball races 13 separated by a spacing member 14 are provided so that the pillar 4 can rotate about its vertical axis. The upper part of the pillar 4 is a close fit in the hollow member 5 and is provided at its upper end with a sealing device comprising packing 15 held in place by a disc 16. The pillar thus acts as a piston housed in the chamber 21 constituting the interior of hollow member 5. The pillar 4 has near its upper end a vertical groove 17 extending vertically along part of its surface and the member 5 is provided with a set screw 18 whose end is located in the groove 17, and prevents relative rotation of member 5 and pillar 4.

The member 5 is provided with an outwardly flared collar 19 which fits on a mating support member 20 when the pillar 5 is in its lower position and thus assists in supporting the base 3. At the top of chamber 21 is an inlet 22 in communication with a source of pressure fluid (not shown) through flexible pipe 23 and a valve (not shown) by which hydraulic fluid can be supplied to chamber 21, cut off therefrom to leave the chamber 21 full of fluid, or by which the pipe 23 can be put into communication with an outlet pipe (not shown) by which fluid can escape from the chamber 21. The inlet 22 is in that part of the member 5 which is cut away to form the section of Fig. I but the position thereof is indicated in dotted outline. Lubricant can be supplied from an oil chamber 25 through a pipe 24 to the contacting surfaces of members 4 and 5.

Framework 1 is formed of four vertical girders 26 and cross girders 27 holding the framework 1 rigid and extending over the portion of the base 3 which is outside the cover 2 to support a track 28 by which lifting tackle or vessels containing formed dispersion can be brought over a mould on the base 3. The cover 2 is fixed to the framework 1 by an angle member 42 at each corner, and has a rectangular mouth, formed of four low vertical walls 29, and a roof portion 30, formed of two side faces which slope inwards each from one of side walls 29 and meet along a centrally disposed ridge, and two end faces sloping inwards from the two end walls. The cover is double-walled throughout, the inner and outer walls being fixed to and spaced apart by a rectangular framework. The space between the inner and outer walls may be packed with insulating material or alternatively means may be provided to supply steam to the space so as to prevent condensation of steam on the inner wall when the apparatus is in use. Beneath and attached to the cover 2 is a downwardly extending channel-shaped member 41, in which is located an endless sealing strip 31. The shape of the cover is such that when the base 3 is in its raised position the sealing strip 31 contacts with the member 6 of the base 3 to form a closed chamber whose base is the trough 8, whose walls are the walls 29 of the cover, and whose roof is the roof 30 thereof. The seal 31 prevents excessive loss of steam when the apparatus is in use, though it need not be of such a nature as to withstand a substantial pressure difference between the inside and outside of the cover. In the roof 30 of the cover 2 are a number of inlets 32 in communication with headers 33 and 34 through which steam can be supplied to the chamber through inlet pipe 35. The cover is also provided with a thermometer 36 by which the temperature inside the cover can be observed.

Attached to the framework 1 are two bars 37 and 38 extending downwardly of the cover 2 and corresponding stop members 39 and 40 are attached to adjacent corners of base 3 such that when one mould is under cover 2 stop 39 bears against bar 37, while when the other mould is under the cover stop 40 bears against bar 38.

The use of the apparatus will now be described with reference to vulcanizing foamed compounded rubber latex in closed moulds suitable for the manufacture of mattresses. It is assumed that the latex is compounded to gel in the cold and that the base is in the raised position with stop 39 against bar 37. A mould is first placed upon that half of the base 3 which is under the track 28, and ungelled latex foam is delivered into the mould from vessels brought into position by movement along the track. The foam in the mould is then allowed to gel. The base is then lowered, and caused to rotate about the vertical axis of pillar 4 and member 5 by manual operation so that stop 40 comes against bar 38 and the mould is thus brought under the cover 2 with the members 6 in register with the walls 29 of the cover. Hydraulic fluid, for example water, is then supplied to the chamber 21 through pipe 23 and inlet 22 and the member 5 is raised vertically by sliding relative to the pillar 4 until sealing strip 31 is in close contact with the framework 6; the mould is thus enclosed between the cover and the trough 8. The supply of hydraulic fluid is then cut off so that the apparatus is kept in this position, and trap 9 is connected to a drain pipe through a coupling (not shown). Steam is then supplied to the chamber formed by cover 2 and trough 8 through inlet pipe 35, headers 33 and 34 and inlets 32. Condensate will at first form inside the chamber. This will collect in trough 8 and trap 9 and excess will run off to the drain. As the temperature indicated by the thermometer 26 approaches 100° C., the supply of steam is cut down until only sufficient is supplied to prevent cooling as heat is lost through radiation and the temperature is thus maintained at substantially 100° C. During these operations some condensate will also form on the inner sloping walls of cover 30, and will run down the sloping faces of the cover and the walls 29 into the trough 8 and thence out through trap 9. Trap 9 will also ensure that no great pressure of steam can be built up temporarily inside the chamber through inadequate control of the supply of steam, and valucanization of the dispersion in the mould will thus proceed under substantially uniform conditions. While vulcanization of foam in the mould within the chamber is proceeding, a second mould is placed on the other side of the base 3, which now is under the track 28, and is filled with dispersion and allowed to gel in the same way.

The vulcanization in the one mould and filling of the other mould being complete, the supply of steam to the inlets 32 is cut off, the coupling between the pipe 9 and the drain pipe is unfastened, and by proper manipulation of the valve controlling the supply of fluid to and from chamber 21, fluid is allowed to escape from the chamber through pipe 23 so that the whole of the structure comprising the member 5, the base 3 and the moulds thereon is lowered until flared collar 19 rests on the supporting member 20; the base 3 is then rotated by hand to bring stop 40 away from bar 38, and bring stop 39 against bar 37, the pillar 4 also rotates in the bearing 13 by virtue of the set screw 18 projecting into the channel 17. The mould containing unvulcanized dispersion is thus brought immediately under the cover 2 and the mould containing the vulcanized dispersion is simultaneously brought under the track 28. Fluid is then again supplied to the chamber 21 through pipe 23 and inlet 22 so that one frame 6 of base 3 is again brought against sealing strip 31 of cover 2. The gelled dispersion in the mould now within the chamber formed between cover 2 and trough 8 is then vulcanized as has been described above, and while this is proceeding the mould containing the previously vulcanized dispersion now under the track 28 is removed, another mould is put in its place, and the sequence of operations is repeated.

Instead of allowing the dispersion to gell before it is brought under the cover filling of an empty mould may be delayed until vulcanization of the dispersion in the other mould is complete and the base moved round forthwith so that movement of the base is complete before gelling occurs. Movement of the gelled, unvulcanized foam is then entirely avoided.

By means of this apparatus the production of foamed rubber mattresses and other articles can be carried out in continuous manner with minimum disturbance to the foamed dispersion in the mould while it is ungelled or unvulcanized, the particular construction of cover 30, being one which minimizes the possibility of condensate falling on unvulcanized foam beneath it, when open moulds are employed.

Various modifications of the apparatus are possible. Thus instead of having only two moulds the base may accommodate three or four moulds. Where three moulds are accommodated, for example, the base will be rotated by a third of a revolution at a time and each mould will occupy in turn three positions, one of which will be under the cover; of the other two one may be a loading position and the other an unloading position. Similarly when four moulds are accommodated the base will be rotated by a quarter of a revolution each time and each mould will in turn occupy four positions, one of which will be under the cover and of the other three one may be a loading position, one a gelling position and the other an unloading position. Although this last mentioned arrangement involves moving the mould while the foam therein is in a gelled but unvulcanized condition, no serious amount of rippling of the foam results since the apparatus involves only a small smooth movement of the mould, whereas in prior art methods which have induced rippling a much more extensive movement has been necessary, frequently involving moving the mould from a conveyor or track to an autoclave, with consequent jarring or like action.

Instead of using a hydraulic ram for raising and lowering the base this can be done by other methods, as for example by a rack on the vertical support and a pinion engaging therewith operated by electric motor or otherwise, or the lifting mechanism may comprise worm gearing. Again other methods for preventing development of superatmospheric pressure within the chamber may be provided; for example a lever or spring-loaded ball valve may be provided adjusted to blow when the pressure inside becomes significantly greater than atmospheric, say 1 lb. per sq. inch above atmospheric.

Having described my invention, I claim:

1. Apparatus for gelling and vulcanizing foamed rubber latex which comprises a cover having a sloping roof and having an opening below said roof and a sealing strip about said opening, an open mold support having an edge to seal against said sealing strip to form a closed mold chamber, a supporting pillar for said mold at one side of said cover rotatable on a vertical axis to move said mold support to and from a position beneath said cover and means to move said pillar and mold support vertically to and from engagement with said sealing strip, and means to admit steam to the space beneath said cover.

2. The apparatus of claim 1 in which a second support is mounted on said pillar substantially level with said first support and positioned to move beneath said cover when said first support is moved away from said cover.

3. The apparatus of claim 1 in which said support comprises a drip trough and an outlet therefrom for condensate from said chamber.

4. The apparatus of claim 1 in which said cover comprises an enclosing, substantially vertical, wall extending downwardly from the lower part of said roof.

5. The apparatus of claim 1 in which said means to move said pillar and mold support vertically comprises fluid pressure means.

THOMAS JAMES RIMBAULT DIBDIN.

REFERENCES CITED

The following references are of record in the file of this patent:

UNITED STATES PATENTS

| Number | Name | Date |
|---|---|---|
| 665,258 | Nielsen et al. | Jan. 1, 1901 |
| 1,520,214 | Thompson | Dec. 23, 1924 |
| 2,198,493 | Freeman | Apr. 23, 1940 |
| 2,316,352 | Minns et al. | Apr. 13, 1943 |
| 2,350,175 | Luxenberger | May 30, 1944 |